United States Patent
Maze

(10) Patent No.: US 6,244,557 B1
(45) Date of Patent: Jun. 12, 2001

(54) UMBRELLA MOUNTING DEVICE FOR A STROLLER

(76) Inventor: Susan G. Maze, #17 Waglisla Street P.O. Box. 911, Waglisla, BC (CA), V0T 1Z0

( * ) Notice: Subject to any disclaimer, the term of this patent is extended or adjusted under 35 U.S.C. 154(b) by 0 days.

(21) Appl. No.: 09/466,084

(22) Filed: Dec. 17, 1999

(51) Int. Cl.[7] .................................................. A01K 97/10
(52) U.S. Cl. .......................... 248/541; 248/214; 248/539; 248/535; 248/298.1; 248/230.8; 248/408
(58) Field of Search .................... 248/541, 214, 248/539, 535, 534, 298.1, 230.8, 408; 135/34.2, 21

(56) References Cited

U.S. PATENT DOCUMENTS

| | | | |
|---|---|---|---|
| 336,363 | * | 2/1886 | Ward ........................ 135/21 |
| D. 352,390 | | 11/1994 | Shrum . |
| 635,612 | * | 10/1899 | Tardel .............................. 248/512 X |
| 2,093,951 | | 9/1937 | Bosket . |
| 3,304,035 | * | 2/1967 | Davis ..................... 248/40 |
| 3,848,838 | | 11/1974 | Thomas . |
| 3,904,161 | * | 9/1975 | Scott ...................................... 248/43 |
| 4,008,874 | * | 2/1977 | Conway, Jr. .......................... 248/534 |
| 4,334,692 | * | 6/1982 | Lynch .................................. 280/79.1 |
| 4,871,141 | | 10/1989 | Chen . |
| 4,887,786 | * | 12/1989 | Stokes .................................. 248/512 |
| 4,919,379 | | 4/1990 | Goetz . |
| 5,040,763 | * | 8/1991 | Wilson ................................. 248/539 |
| 5,478,041 | | 12/1995 | Mayne . |

* cited by examiner

Primary Examiner—Leslie A. Braun
Assistant Examiner—A. Joseph Wujciak

(57) ABSTRACT

A umbrella mounting device for a stroller for protecting the user of a stroller from harsh weather. The umbrella mounting device for a stroller includes a bridging assembly adapted for bridging between the spaced handle bars of a stroller. The bridging assembly comprises a pair of side members each adapted for engaging one of the spaced handle bars of the stroller. A holding assembly adapted for engaging a handle of the umbrella. A support member for releasably engaging said holding assembly to said bridging assembly. A plurality of band clamps for securing said holding assembly to the handle of the umbrella and said side members to the handles of the stroller.

11 Claims, 3 Drawing Sheets

UMBRELLA MOUNTING DEVICE FOR A STROLLER

BACKGROUND OF THE INVENTION

1. Field of the Invention

The present invention relates to umbrella holding brackets and more particularly pertains to a new umbrella mounting device for a stroller for protecting the user of a stroller from harsh weather.

2. Description of the Prior Art

The use of umbrella holding brackets is known in the prior art. More specifically, umbrella holding brackets heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,478,041; U.S. Pat. No. 4,871,141; U.S. Pat. No. 3,848,838; U.S. Pat. No. 2,093,951; U.S. Pat. No. Des. 352,390; and U.S. Pat. No. 4,919,379.

While these devices fulfill their respective, particular objectives and requirements, the aforementioned patents do not disclose a new umbrella mounting device for a stroller. The inventive device includes a bridging assembly adapted for bridging between the spaced handle bars of a stroller. The bridging assembly comprises a pair of side members each adapted for engaging one of the spaced handle bars of the stroller. A holding assembly adapted for engaging a handle of the umbrella. A support member for releasably engaging said holding assembly to said bridging assembly. A plurality of band clamps for securing said holding assembly to the handle of the umbrella and said side members to the handles of the stroller.

In these respects, the umbrella mounting device for a stroller according to the present invention substantially departs from the conventional concepts and designs of the prior art, and in so doing provides an apparatus primarily developed for the purpose of protecting the user of a stroller from harsh weather.

SUMMARY OF THE INVENTION

In view of the foregoing disadvantages inherent in the known types of umbrella holding brackets now present in the prior art, the present invention provides a new umbrella mounting device for a stroller construction wherein the same can be utilized for protecting the user of a stroller from harsh weather.

The general purpose of the present invention, which will be described subsequently in greater detail, is to provide a new umbrella mounting device for a stroller apparatus and method which has many of the advantages of the umbrella holding brackets mentioned heretofore and many novel features that result in a new umbrella mounting device for a stroller which is not anticipated, rendered obvious, suggested, or even implied by any of the prior art umbrella holding brackets, either alone or in any combination thereof.

To attain this, the present invention generally comprises a bridging assembly adapted for bridging between the spaced handle bars of a stroller. The bridging assembly comprises a pair of side members each adapted for engaging one of the spaced handle bars of the stroller. A holding assembly adapted for engaging a handle of the umbrella. A support member for releasably engaging said holding assembly to said bridging assembly. A plurality of band clamps for securing said holding assembly to the handle of the umbrella and said side members to the handles of the stroller.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new umbrella mounting device for a stroller apparatus and method which has many of the advantages of the umbrella holding brackets mentioned heretofore and many novel features that result in a new umbrella mounting device for a stroller which is not anticipated, rendered obvious, suggested, or even implied by any of the prior art umbrella holding brackets, either alone or in any combination thereof.

It is another object of the present invention to provide a new umbrella mounting device for a stroller which may be easily and efficiently manufactured and marketed.

It is a further object of the present invention to provide a new umbrella mounting device for a stroller which is of a durable and reliable construction.

An even further object of the present invention is to provide a new umbrella mounting device for a stroller which is susceptible of a low cost of manufacture with regard to both materials and labor, and which accordingly is then susceptible of low prices of sale to the consuming public, thereby making such umbrella mounting device for a stroller economically available to the buying public.

Still yet another object of the present invention is to provide a new umbrella mounting device for a stroller which provides in the apparatuses and methods of the prior art some of the advantages thereof, while simultaneously overcoming some of the disadvantages normally associated therewith.

Still another object of the present invention is to provide a new umbrella mounting device for a stroller for protecting the user of a stroller from harsh weather.

Yet another object of the present invention is to provide a new umbrella mounting device for a stroller which includes a bridging assembly adapted for bridging between the spaced handle bars of a stroller. The bridging assembly comprises a pair of side members each adapted for engaging one of the spaced handle bars of the stroller. A holding assembly adapted for engaging a handle of the umbrella. A support member for releasably engaging said holding assembly to said bridging assembly. A plurality of band clamps for securing said holding assembly to the handle of the umbrella and said side members to the handles of the stroller.

Still yet another object of the present invention is to provide a new umbrella mounting device for a stroller that provides shade to a person who is pushing a stroller in bright and clear weather.

Even still another object of the present invention is to provide a new umbrella mounting device for a stroller that provides protection from the rain for a person pushing a stroller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
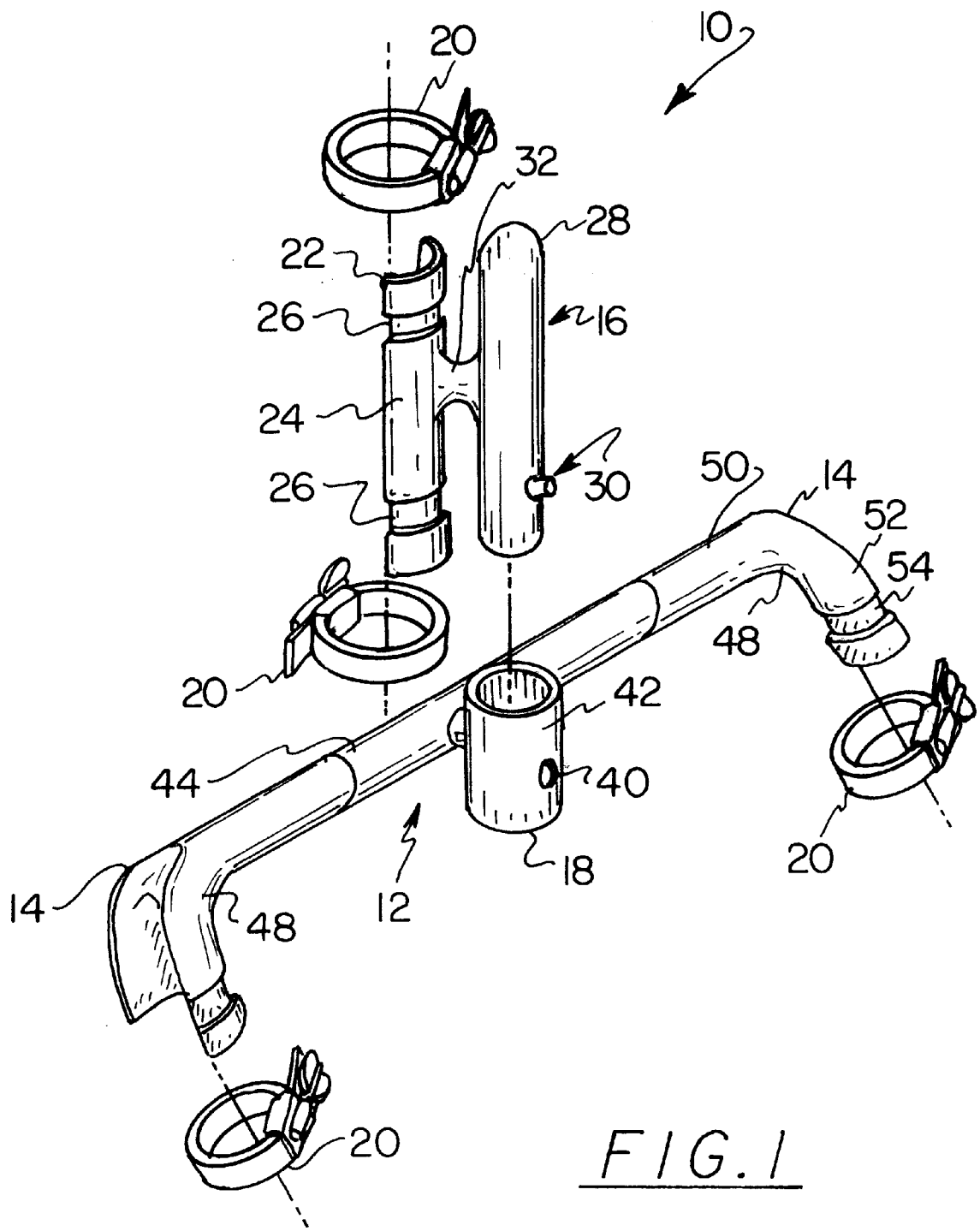
FIG. 1 is a perspective exploded view of a new umbrella mounting device for a stroller according to the present invention.
Figure 2:
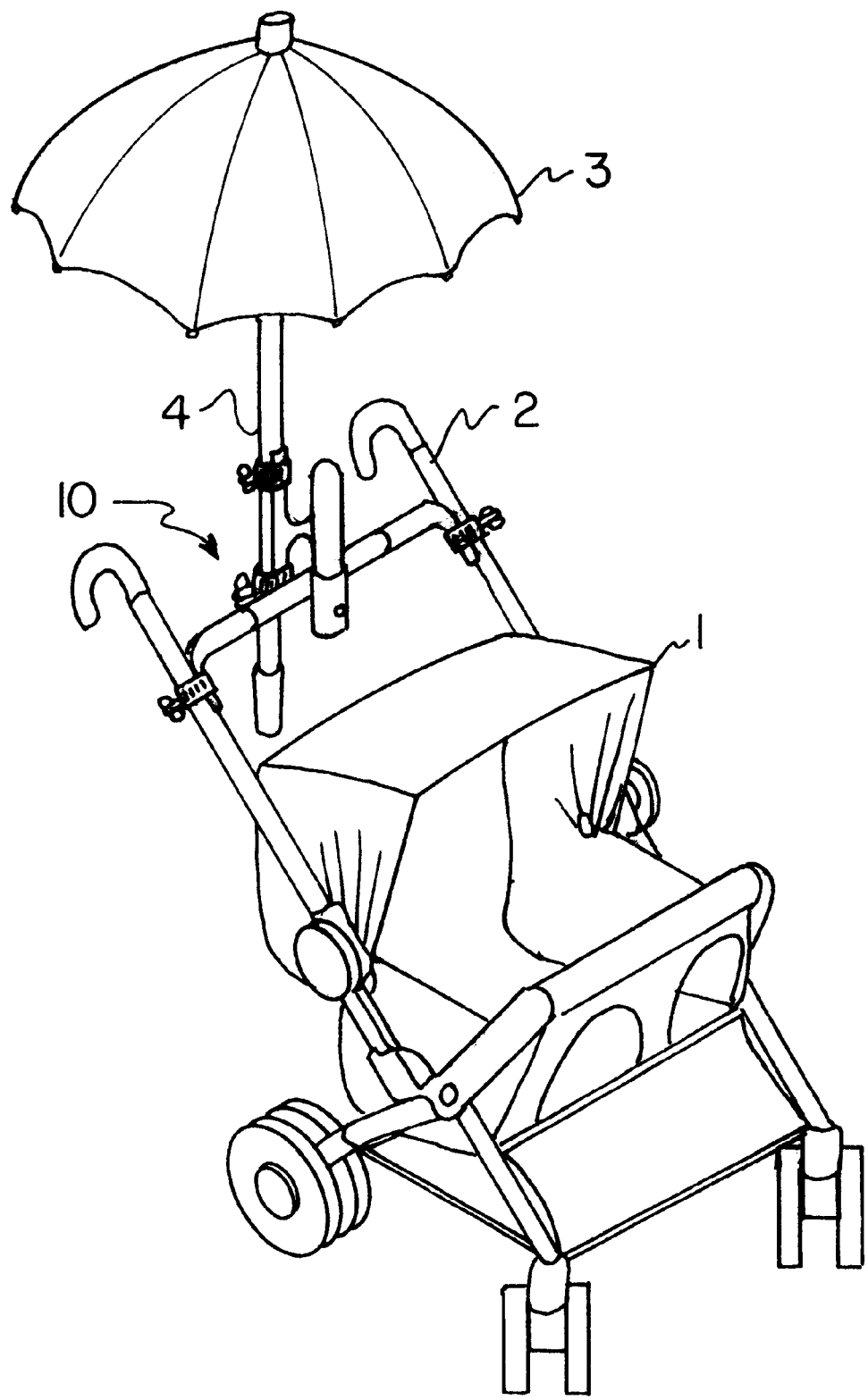
FIG. 2 is a perspective view of the present invention in use.
Figure 3:
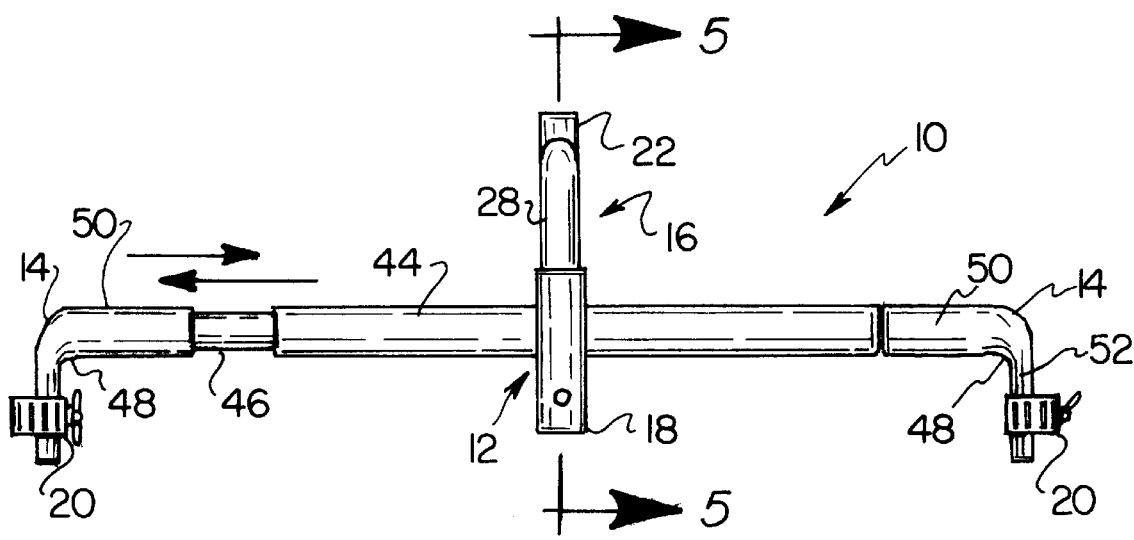
FIG. 3 is a front elevational view of the present invention.
Figure 4:
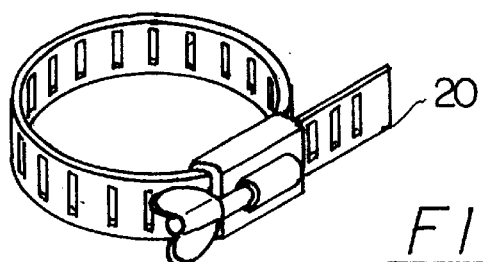
FIG. 4 is an enlarged perspective view of the band clamps of the present invention.

With reference now to the drawings, and in particular to FIGS. 1 through 5 thereof, a new umbrella mounting device for a stroller embodying the principles and concepts of the present invention and generally designated by the reference numeral 10 will be described.

As best illustrated in FIGS. through 5, the umbrella mounting device for a stroller 10 generally comprises a bridging assembly 12 adapted for bridging between the spaced handle bars 2 of a stroller 1. The bridging assembly comprises a pair of side members 14 each adapted for engaging one of the spaced handle bars.

As shown in FIG. 1, a holding assembly 16 adapted for engaging a handle 4 of an umbrella 3. A support member 18 for releasably engaging the holding assembly to the bridging assembly.

As shown in FIGS. 1 through 4, a plurality of band clamps 20, commonly refereed to as hose clamps, are for securing the holding assembly to the handle of the umbrella and the side members to the handles of the stroller.

Figure 5:
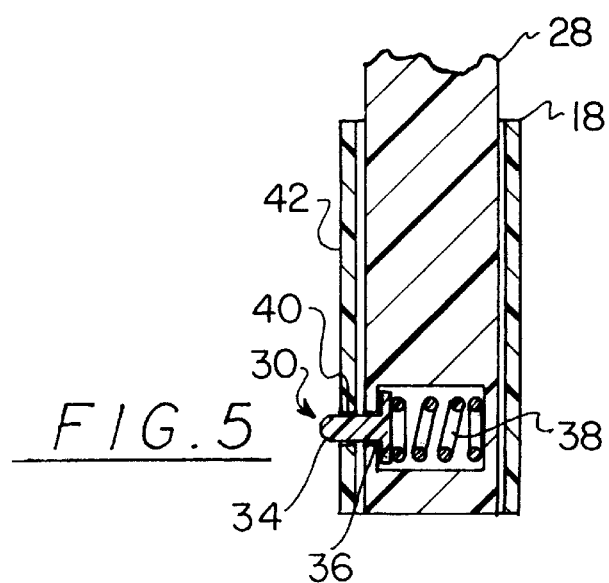
FIG. 5 is a cross-sectional view of the present invention taken along line 5—5 of FIG. 3.

The holding assembly has an arcuate first member 22 with a curved inner surface adapted for abutting against a portion of the exterior surface of the handle of the umbrella. The first member has an outer surface 24 with a pair of channels 26 formed therein for receiving portions of the band clamps looped about the handle of the umbrella for resisting shifting of the band clamps while the first member is abutted against the handle of the umbrella. Each of the channels are orientated transverse to a longitudinal axis of the first member and extending across a width of the first member. A cylindrical second member 28 is coupled to the first member. The second member is for engaging the support member. The second member has rounded hemispherical ends adapted for inserting into the support member. The second member of the holding assembly has a latching assembly 30 for securing the second member to the support member and a neck portion 32 connecting the first member to the second member in a spaced relationship. As shown in FIG. 5, the latching assembly has a tab 34 extendable through a hole 36 in the second member and is outwardly biased through the hole by a spring 38.

The support member has a generally cylindrical tubular shape for receiving the holding assembly. The support member has a bore extending through a length thereof for receiving the second member of the housing assembly. An aperture 40 extends through a side wall 42 of the support member for receiving the tab of the latching assembly. A generally cylindrical bridging sleeve 44 is coupled to the support member. The bridging sleeve has ends that are adapted for receiving at least a portion of the side members.

Each of the side members has an interior portion 46 adapted for inserting into an end of the bridging sleeve of the support member. Note FIG. 3. The insertion of the side members in to the bridging sleeve allows for the side members to accommodate a variety of angles of handle bars of the strollers. A generally L-shaped exterior portion 48 has a first leg 50 and a second leg 52. The first leg is coupled to the interior portion. The second leg has an arcuate cross-section for abutting against the cylindrical outer surfaces of the handles of the stroller. The second leg has an arcuate groove 54 for resisting shifting of the band clamps when the band clamps engage the handle of the stroller. The arcuate groove extends transverse to a length extent of the second leg.

In use, the user would secure the first member of the holding assembly to the handle of the umbrella using a pair of band clamps. The user would then take the bridging assembly and adjust the side arms to span the distance between the handle bars of the stroller. The user would then secure each of the side members to the respective handle bars by a band clamp. The support member is coupled to the bridging assembly and is for receiving the second member of the holding assembly such that the latching assembly engages the aperture of the support member such that the holding assembly is held in place. The user now can quickly and easily attach an umbrella to a stroller to provided shade or protection harsh weather while pushing the stroller.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An umbrella mounting device for securing an umbrella to a pair of handles of a stroller, the mounting device comprising:

a bridging assembly adapted for bridging between the spaced handle bars of the stroller, said bridging assembly comprising a pair of side members each adapted for engaging one of the spaced handle bars; and a holding assembly adapted for engaging a handle of the umbrella;

a support member for releasably engaging said holding assembly to said bridging assembly;

a plurality of band clamps for securing said holding assembly to the handle of the umbrella and said side members to the handles of the stroller; and wherein said holding assembly has an arcuate first member with a curved inner surface adapted for abutting against a portion of the exterior surface of the handle of the umbrella, a cylindrical second member is coupled to said first member, said second member is for engaging said support member.

2. The mounting device as set forth in claim 1 wherein said first member has an outer surface with a pair of channels formed therein for receiving portions of said band clamps for resisting shifting of said band clamps while the first member is abutted against the handle of the umbrella, each of said channels extending across a width of said first member and perpendicularly aligned with a longitudinal axis of said first member.

3. The mounting device as set forth in claim 1 wherein said holding assembly has a neck portion connecting said first member to said second member in a spaced relationship.

4. The mounting device as set forth in claim 1 wherein said second member of said holding assembly has a latching assembly for securing said second member to said support member.

5. The mounting device as set forth in claim 1 wherein said support member has a generally cylindrical tubular shape for receiving said holding assembly, said support member having a bore extending through a length thereof for receiving said second member of said holding assembly.

6. The mounting device as set forth in claim 5 wherein said bridging assembly has a generally cylindrical bridging sleeve coupled to said support member, said bridging sleeve having ends being for receiving at least a portion of said side members.

7. The mounting device as set forth in claim 6 wherein each of said side members has an interior portion adapted for inserting into an end of said bridging sleeve of said support member, a generally L-shaped exterior portion having a first leg and a second leg, said first leg being coupled to said interior portion, said second leg having an arcuate cross-section for abutting against the cylindrical outer surfaces of the handle bars of the stroller.

8. The mounting device as set forth in claim 7 wherein said second leg has an arcuate groove for resisting shifting of said band clamps when said band clamps engage the handle bars of the stroller, said arcuate groove extending transverse to a length extent of said second leg.

9. An umbrella mounting device for securing an umbrella to a pair of spaced handle bars of a stroller, the mounting device comprising:

a bridging assembly adapted for bridging between the spaced handle bars of the stroller, said bridging assembly comprising a pair of side members each adapted for engaging, one of the spaced handle bars;

a holding assembly adapted for engaging a handle of the umbrella;

a support member for releasably engaging said holding assembly to said bridging assembly, a pair of side members being coupled to said support member;

a plurality of band clamps for securing said holding assembly to the handle of the umbrella and said side members to the handles of the stroller;

said holding assembly having an arcuate first member with a curved inner surface adapted for abutting against a portion of the exterior surface of the handle of the umbrella, said first member having an outer surface with a pair of channels formed therein for receiving portions of said band clamps looped about the handle of the umbrella for resisting shifting of said band clamps while said first member is abutted against the handle of the umbrella, each of said channels being orientated transverse to a longitudinal axis of said first member and extending across a width of said first member, a cylindrical second member being coupled to said first member, said second member being for engaging said support member, said second member having a rounded hemispherical ends adapted for inserting into said support member, said second member of said holding assembly having a latching assembly for securing said second member to said support member, and a neck portion connecting said first member to said second member in a spaced relationship, said latching assembly having a tab extendable through a hole in said second member and being outwardly biased through said hole by a spring;

said support member having a generally cylindrical tubular shape for receiving said holding assembly, said support member having a bore extending through a length thereof for receiving said second member of said housing assembly, an aperture extending through a side wall of said support member for receiving said tab of said latching assembly, a generally cylindrical bridging sleeve being coupled to said support member, said bridging sleeve having ends being adapted for receiving at least a portion of said side members; and each of said side members having an interior portion adapted for inserting into an end of said bridging sleeve of said support member, a generally L-shaped exterior portion having a first leg and a second leg, said first leg being coupled to said interior portion, said second leg having an arcuate cross-section for abutting against the cylindrical outer surfaces of the handles of the stroller, said second leg having an arcuate groove for resisting shifting of said band clamps when said band clamps engage the handle of the stroller, said arcuate groove extending transverse to a length extent of said second leg.

10. An umbrella mounting device for securing an umbrella to a pair of handles of a stroller, the mounting device comprising:

a bridging assembly adapted for bridging between the spaced handle bars of the stroller, said bridging assembly comprising a pair of side members each adapted for engaging one of the spaced handle bars; and a holding assembly adapted for engaging a handle of the umbrella;

a support member for releasably engaging said holding assembly to said bridging assembly;

a plurality of band clamps for securing said holding assembly to the handle of the umbrella and said side members to the handles of the stroller;

wherein said support member has a generally cylindrical tubular shape for receiving said holding assembly, said support member having a bore extending through a length thereof for receiving said second member of said holding assembly;

wherein said bridging assembly has a generally cylindrical bridging sleeve coupled to said support member, said bridging sleeve having ends being for receiving at least a portion of said side members; and wherein each of said side members has an interior portion adapted for inserting into an end of said bridging sleeve of said support member, a generally L-shaped exterior portion having a first leg and a second leg, said first leg being coupled to said interior portion, said second leg having an arcuate cross-section for abutting against the cylindrical outer surfaces of the handle bars of the stroller.

11. The mounting device as set forth in claim 10, wherein said second leg has an arcuate groove for resisting shifting of said band clamps when said band clamps engage the handle bars of the stroller, said arcuate groove extending transverse to a length extent of said second leg.

* * * * *